Jan. 5, 1971  H. GOEBEL ET AL  3,551,984
TOOL-CHANGING MECHANISM FOR A MACHINE TOOL
Filed Sept. 5, 1968  3 Sheets-Sheet 1

Inventors:
Hellmut GOEBEL
Ernst RAISER
by: Arthur O. Klein
their Attorney

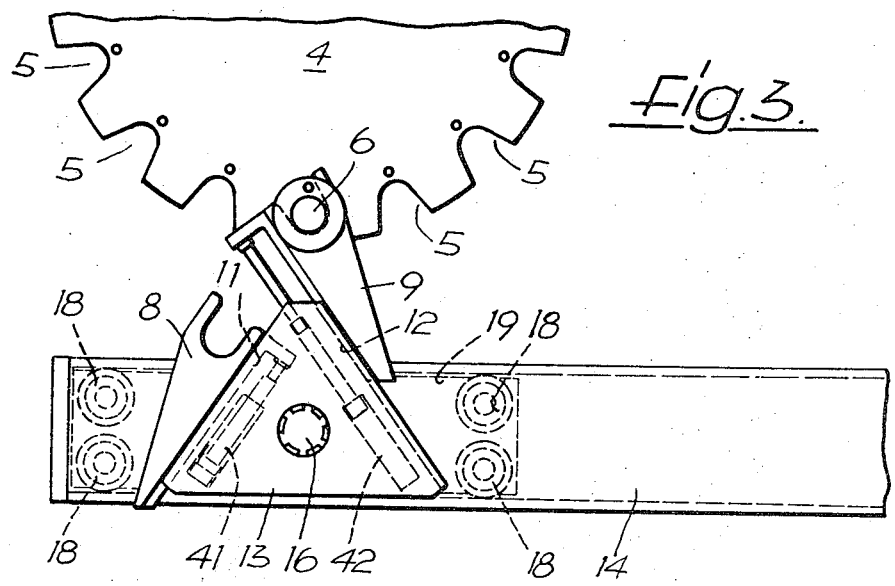
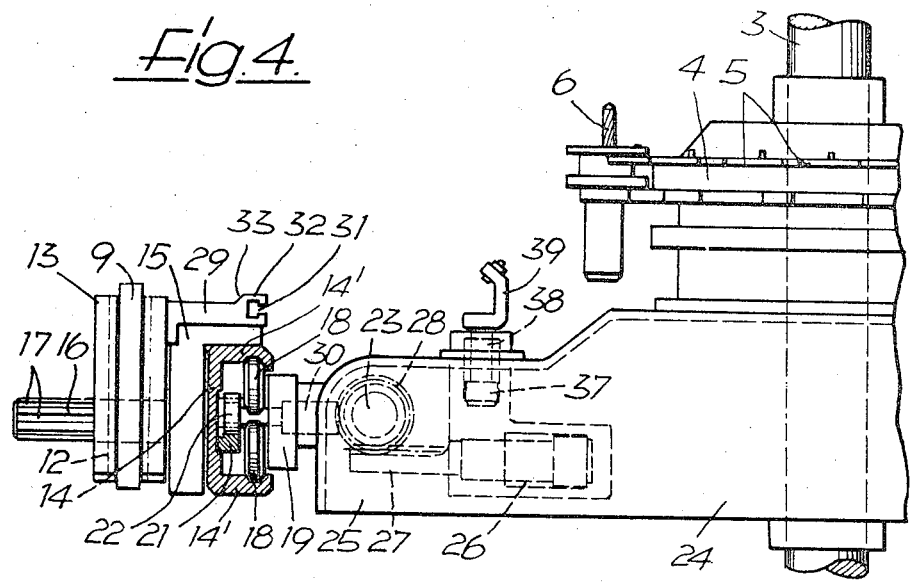
Inventors:
Hellmut GOEBEL
Ernst RAISER
by: Arthur O. Klein
their Attorney Inventors:
Hellmut GOEBEL
Ernst RAISER
by: Arthur O. Klein
their Attorney

ABSTRACT OF THE DISCLOSURE

A tool-changing mechanism for a machine tool in which a guide element is movable from a position adjacent to a magazine to a position adjacent to the tool spindle of the machine and vice versa, and in which two gripping elements are movable independently of each other along separate guide-ways on the common guide element for removing a selected tool from the magizine and for also removing a tool from the tool spindle and for then inserting these tools into the tool spindle and into the magazine, respectively.

---

The present invention relates to a tool-changing mechanism for a machine tool and comprises a tool magazine for different tools and two gripping elements which, when the tools are to be changed, remove a selected tool which is held in the magazine and a tool which is held in the tool spindle of the machine and then insert these tools into the tool spindle and into the magazine, respectively.

There is a tool-changing mechanism of the above mentioned type known in the prior art which is provided with a two-armed lever which carries a gripping element on the end of each arm. This two-armed lever is pivotable about an axis and adapted by a pivotaing movement to grip simultaneously a tool in the work spindle and a tool in the magazine. Since when this two-armed lever is being pivoted its gripping elements described a circular path, it is impossible to move these gripping elements toward a tool in a rectilinear direction vertically to a row of tools in the magazine. For gripping the tools, the known mechanism therefore requires them to be spaced in the magazine at a certain minimum distance from each other. This mechanism further requires the tool magazine to be located in a very particular position relative to the tool spindle and also the tools in the magazine to be held in a position parallel to the axis of the tool spindle. Furthermore, when changing the tools the pivoting movement of the two-armed lever requires considerable space. These requirements which are to be fulfilled by a tool-changing mechanism of the known type render not only the construction of such a mechanism rather difficult but especially also the construction of the resuective machine tool with which this mechanism is to be employed.

It is an object of the present invention to provide a tool-changing mechanism which is designed so that the tool magazine and the gripping elements require very little space and the magazine may be located at any desired position independently of the location of the tool spindle of the machine tool.

For attaining this object, the invention provides a tool-changing mechanism of the type as first described which is designed so that the two gripping elements are slidable independently of each other in saparate guide means on a common guide element, and that further guide means are provided for this guide element which permit the latter to be moved from a magazine position, in which the gripping elements are adapted to remove a tool from the magazine or insert it into the magazine, to a spindle position in which a tool is inserted into or removed from the tool spindle. By mounting these gripping elements so as to be slidable on their guide element, they may be moved toward a tool in the magazine in a direction vertical to a row of these tools in the magazine which permits the tools to be very closely spaced from each other within this row and the magazine thereforeto be made of a relatively small size. By mounting and guiding the gripping elements independently of each other on their common guide element, they may also be moved independently of each other so that when one gripping element is moved, the other gripping element remains stationary. Therefore, none of the gripping elements has to carry out a movement outside of the area between these elements and the respective tool or, in other words, the movements of the gripping elements requires no space outside of the plane which directly connects the gripping elements with the respective tool. Since the guide element itself is provided with guide means which connect its magazine position with its spindle position, the invention permits the magazine to be of any desired design and to be mounted at any desired part of the machine tool which may even be spaced at a considerable distance from the tool spindle of this machine since the connecting guide means as mentioned above may be easily adapted to the different locations and arrangements of the tool spindle and the magazine. Thus, for example, the present invention also permits the tools to be held in the magazine in a position in which their axes extend in a perpendicular direction even though the axis of the tool spindle of the machine extends in a horizontal direction.

The guide-ways on the common guide element for guiding the gripping elements may be of any suitable design and arrangement. Since these gripping elements are movable independently of each other, the guide element will normally require two magazine positions and two spindle positions in each of which a gripping element is guided in the direction toward a tool in the magazine or in the tool spindle, respectively. According to a preferred embodiment of the invention, it is, however, possible to simplify the mechanism considerably by designing the guide element so as to require only one magazine position and one spindle position. The two guide-ways for the gripping elements on the common guide element are for this purpose directed toward a common point of action which in the magazine position of the guide element coincides with the position of a tool in the magazine and in the spindle position with the position of the tool spindle of the machine.

Another advantageous feature of the invention consists in mounting the guide element on a raillike sliding carriage which is movable longitudinally along its guide means between its spindle and magazine positions, and in providing further guide means which permit the guide element to be moved in a direction at a right angle to the plane of this raillike carriage. These different guide means permit the sliding carriage to be moved longitudinally to shift the guide element from the spindle position to the magazine position or vice versa, and they further permit the guide element together with the gripping elements to be moved in each of these positions in a direction parallel to the tool axis for the purpose of withdrawing the tool from its seat either in the magazine or in the tool spindle or for inserting it into the respective seat.

In order to permit the tools to be held in the magazine at any desired angle relative to the axis of the tool spindle of the machine, the invention further provides suitable means for pivoting the guide element about the longitudinal axis of the sliding carriage.

The features and advantages of the present invention will become further apparent from the following detailed description thereof which is to be read with reference to the accompanying drawings, in which:

FIG. 3 shows an enlarged view of a part of the tool-changing mechanism according to FIG. 1, in a position in which a tool is being removed from the magazine;

FIG. 4 shows a cross section which is taken along the line IV—IV of FIG. 1;

FIGS. 6 and 7 show cross sections which are taken along hte line VII—VII of FIG. 1 and illustrate the gripping elements and the guide element of the gripping elements in two different operating positions; while

Figure 1:
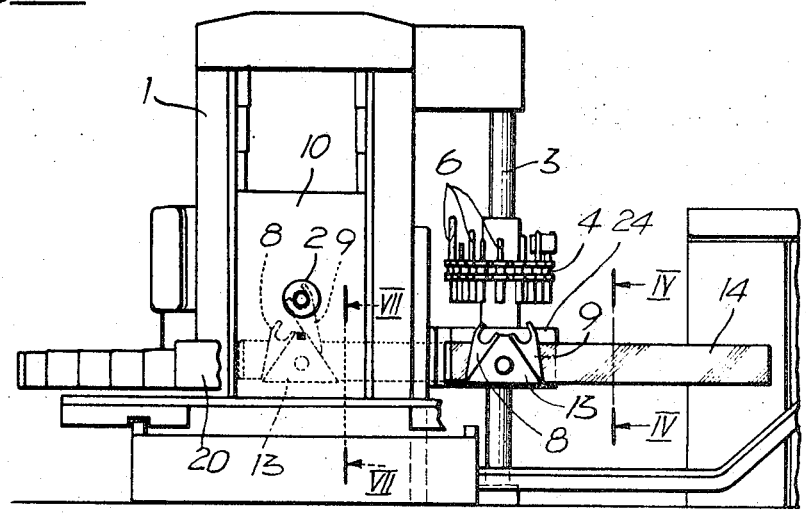
FIGS. 1 and 2 show respectively a front view and a top view of a machine tool which is provided with a tool-changing mechanism according to the invention.
Figure 2:
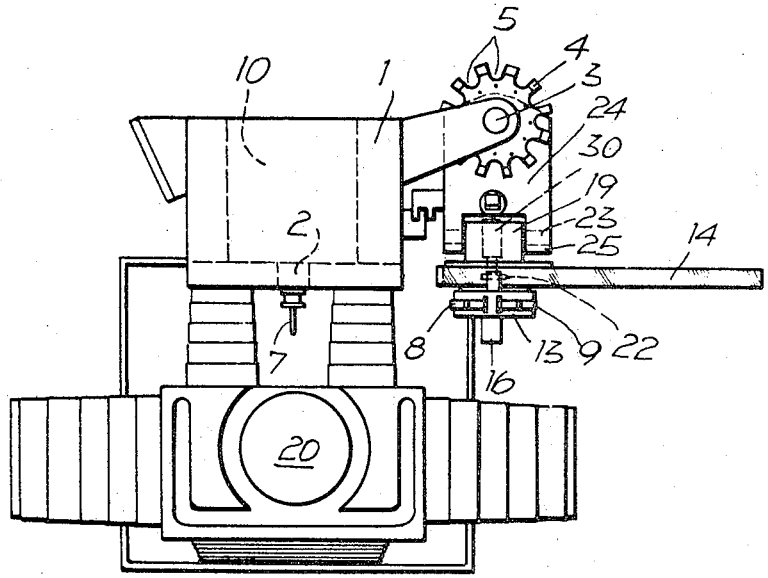

As illustrated in the drawings and particularly in FIGS. 1 and 2 thereof, the machine tool comprises two parallel uprights 1 between which a housing 10 carrying a work or tool spindle 2 is slidable so as to be adjustable to different elevations. In front of the housing 10, a table 20 is provided which is adjustable by suitable means to different positions within a horizontal plane. At the right side of housing 10, a circular magazine disk 4 is mounted so as to be rotatable about the vertical axis of a post 3. The peripheral surface of this disk 4 which forms a tool magazine is provided with recesses 5 forming seats into which tools 6 may be inserted the axes of which extend parallel to the axis of post 3.

The magazine disk 4 is connected in a conventional manner to a driving mechanism, not shown, which is controlled by conventional control means, likewise not shown, so that the magazine disk may be turned according to a predetermined program to any desired position in which its seats 5 are in the location as desired.

For removing tools from the magazine disk 4 and for inserting the same into the work spindle 2 or, vice versa, for removing a tool 7 from the tool spindle 2 and for inserting this tool into a selected seat 5 of the magazine disk 4, a tool-changing mechanism is provided which comprises two gripping elements 8 and 9 for gripping the tools. These gripping elements 8 and 9 are slidable independently of each other in straight directions in two guide-ways 11 and 12, respectively, on a guide element 13 which in turn is connected to a sliding carriage in the form of a rail 14 so as to be movable with the latter within a plane extending at a right angle to the plane passing through the axes of the two guide-ways 11 and 12. Rail 14 carries for this purpose a plate 15 to which a guide rod 16 is rigidly secured on which the guide element 13 is axially slidable but nonrotatable and which is therefore provided with longitudinal grooves 17 into which splines engage.

Rail 14 has a U-shaped cross section and is slidable in its longitudinal direction on four rollers 18, as shown particularly in FIGS. 3 and 4, which are rotatably mounted on a housinglike arm 19. For moving the slide rail 14 along the arm 19 by means of its side arms 14' sliding along the rollers 18, a rack 21 is secured to and extends along the central web of rail 14 between its arms 14' and engages with a pinion 22 which is rotatably mounted in the housinglike arm 19 and may be driven by a motor 30 which is likewise mounted in the arm 19, as indicated in FIGS. 2 and 4.

Figure 5:
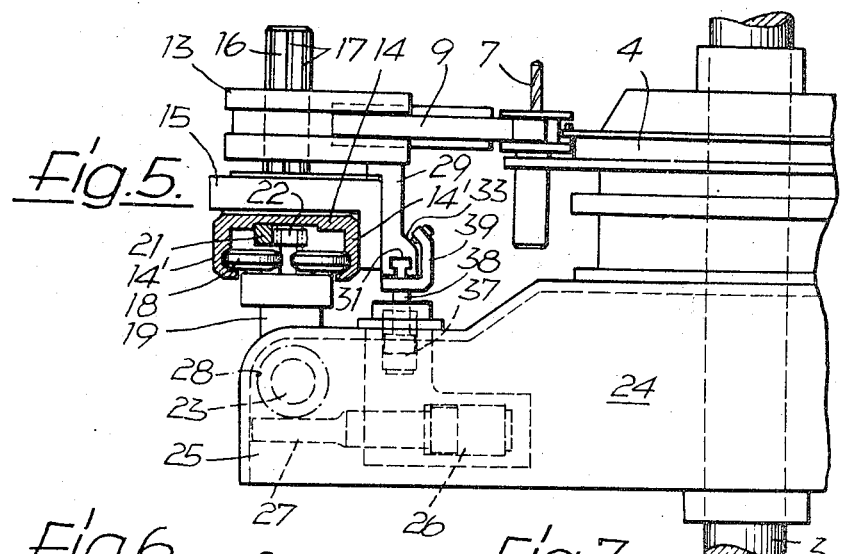
FIG. 5 shows a cross section which is similar to FIG. 4 but taken in the position of the tool carrier as shown in FIG. 3.

Arm 19 is mounted on a shaft 23 and pivotable by the latter about its axis between the two arms of a bifurcated support 24. One arm 25 of this support 24 contains a hydraulic drive unit 26 the piston rod of which is provided in the form of a rack 27 which engages with a pinion 28 which is secured to shaft 23. The reciprocating movements of the piston of the hydraulic drive unit 26 cause the pinion 28 and thus also the shaft 23 to be turned 90° back and forth about their axis, whereby the arm 19 will likewise be turned about an angle of 90° from the position as shown in FIG. 4 to the position as shown in FIG. 5 or vice versa.

When the arm 19 is in the position as illustrated in FIG. 4 and as also shown in full lines in FIG. 1, slide rail 14 may be shifted from the position as shown in full lines in FIGS. 1 and 2 to the position as indicated in dotted lines in FIG. 1, in which the guide element 13 and thus also the gripping elements 8 and 9 are located in their spindle position directly underneath the work spindle 2. If slide rail 14 is pivoted from its position as shown in full lines in FIG. 1 to the position as shown in FIG. 5, guide element 13 and thus also the gripping elements 8 and 9 will be in their magazine position directly adjacent to the magazine disk 4. The plane which is defined by the guide-ways 11 and 12 extends at all times, that is, in the spindle position as well as in the magazine position in a direction at right angles to the axes of the tools 6 which are held in the tool spindle 2 or in the magazine disk 4.

In order to permit the guide element 13 in both of these positions to be moved along its guide rod 16 in a direction parallel to the axes of the tools in the work spindle 2 or in the magazine disk 4, plate 15 is provided with an arm 29, the free end of which opposite to the end facing the guide element 13 forms a bifurcated gripping member 31 the outer arm 32 of which projects from the outer side of the arm 29 and is connected to this side by an inclined surface 33.

Figure 6:
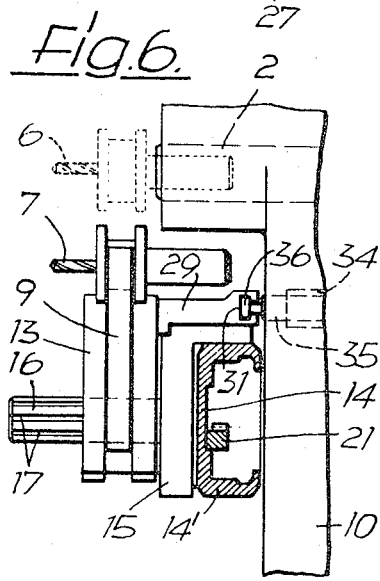
Figure 7:
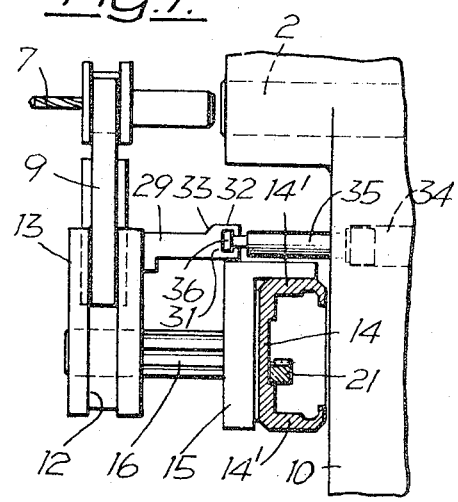

As illustrated particularly in FIG. 6, a hydraulic drive unit 34 is mounted underneath the tool spindle 2 and has an axis extending parallel to this spindle. The outer end of the piston rod 35 of this hydraulic drive unit 34 carries a head 36 which is adapted to fit into the recess in the gripping member 31, and engages therein when the piston of the hydraulic drive unit is in one end position and slide rail 14 is moving to its spindle position. When the hydraulic drive unit 34 is then actuated, guide element 13 will be moved from the position as shown in FIG. 6 to the position as shown in FIG. 7 or vice versa along the guide rod 16, whereby the tool 7 will be withdrawn from the work spindle 2 or be inserted into it, respectively.

As illustrated in FIG. 5, at the inside of the bifurcated support 24 another hydraulic drive unit 37 is mounted. The piston rod 38 of this drive unit carries an angular member 39 the vertical arm of which has an end portion which is bent in accordance with the inclined surface 33 of the arm 29 so that the slide rail 14 may be pivoted to the magazine position without interfering with the arm of the angular member 39, while at a vertical reciprocating movement of piston rod 38 the angular member 39 will take the arm 29 along in both directions. Thus, when the hydraulic drive unit 37 is actuated, guide element 13 may be moved in the same manner as in the spindle position along the guide rod 16 for the purpose of inserting tools into and for removing them from the seats 5 of magazine disk 4.

The two guide-ways 11 and 12 of guide element 13 are directed toward a common point of action of the gripping elements 8 and 9. Therefore, in the magazine position and in the spindle position of guide element 13 this point of action coincides with the position of a tool 6 or 7 in the magazine disk 4 or in the work spindle 2, respectively. For moving the gripping elements 8 and 9 along the guide-ways 11 and 12, hydraulic drive units 41 and 42 as indicated in FIG. 3 are mounted within the guide element 13. The gripping elements 8 and 9 themselves as well as the means for holding the tools 6 and 7 in the magazine disk 4 or in the tool spindle 2 are of a conventional design and therefore do not need to be further described.

The mode of operation of the tool changing mechanism according to the invention is self-evident from the foregoing description of its construction. If, for example, a tool 7 which is held in the tool spindle 2 of the machine is to be exchanged for a new tool 6 which is held in the magazine disk 4, slide rail 14 is at first moved to the magazine position. The gripping element 9 is then moved upwardly by the hydraulic drive unit 42 so as to grip the tool 6. The hydraulic drive unit 37 then moves the guide element 13 upwardly along guide rod 16 from the position as shown in FIG. 5 so that the tool 6 will be lifted out of the magazine disk 4. The gripping element 9 is then moved back to its original position. Thereafter, slide rail 14 is pivoted by the hydraulic drive unit 26 from the position as shown in FIG. 5 to the position as shown in FIG. 4 and is then moved along its guide arm 19 to the spindle position as shown in FIGS. 6 and 7. In this position, at first the gripping element 8 is moved forwardly by means of the hydraulic drive unit 41 to its active position in which it grips the tool 7 which is held in the tool spindle 2. Thereafter, guide element 13 is moved by the hydraulic drive unit 34 from the position as shown in FIG. 6 to that as shown in FIG. 7, whereby the tool 7 is drawn out of the tool spinde 2. The gripping element 8 is then moved back to its original position and the other gripping element 9 together with tool 6 is moved to its active position. Thereafter, guide element 13 is moved back from its position as shown in FIG. 7 to that as shown in FIG. 6 so that the tool in the gripping element 9 will be inserted into the work spindle 2. Gripping element 9 is then returned to its original position, slide rail 14 is shifted to the position as shown in full lines in FIG. 1 and pivoted from this position to the magazine position as shown in FIG. 5 in which guide element 13 is at first moved upwardly along guide rod 16, whereupon gripping element 8 is moved forwardly and by lowering the guide element 13, the tool is inserted into its seat in magazine disk 4. Of course, the magazine disk is always turned in the conventional manner so as to move the proper tool or the proper tool seat to the point of action of the gripping elements 8 and 9.

Figure 8:
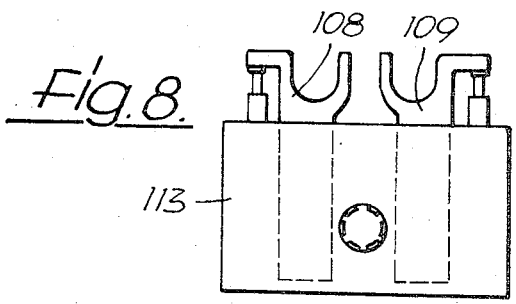
FIG. 8 shows a top view of a guide element according to a modification of the invention.

FIG. 8 illustrates a modification of the invention in which the griping elements 108 and 109 are movable in parallel guide-ways in a guide element 113. The tool changing mechanism is otherwise designed exactly like the mechanism as described with reference to FIGS. 1 to 7, except for the difference that for the slide rail 14 carrying the guide element 113 two magazine positions and two spindle positions are provided in each of which one of the gripping elements 108 or 109 is movable in the direction toward the respective seat 5 of the magazine disk 4 or toward the tool spindle 2. For changing the tools, it is therefore necessary to provide two additional movements for moving the slide rail for the guide element 113 from one to the other magazine or spindle position. The movements of the griping elements to their active or tool-engaging positions extend, however, parallel to each other and these elements may therefore be guided in a direction exactly vertical to a row of tools in the magazine disk 4.

From the foregoing description it is apparent that even if the tool spindle 2 of the machine extends horizontally, the invention permits the tools to be held in the magazine disk in a position in which their axes extend perpendicularly. This has the advantage that the tools may project into the free area above the magazine disk and that therefore tools of different lengths may be held in this disk.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. In a tool-changing mechanism for a machine tool comprising a tool magazine for different tools, and two gripping elements for exchanging a tool adapted to remove a selected tool from the magazine and also to remove a tool from the tool spindle of the machine and then to insert these tools into the tool spindle and into the magazine, respectively, the improvement comprising a common guide element and two separate guide-ways on said guide element on which said two gripping elements are slidable independently of each other, means for moving said gripping elements along said guide-ways, guide means for guiding said guide element so as to be movable from a magazine position adjacent to said magazine in which said gripping elements are adapted to remove a tool from or to insert a tool into said magazine to a spindle positions adjacent to said tool spindle in which said gripping elements are adapted to insert a tool into or to remove a tool from said tool spindle and means for moving said guide element along said guide means from one of said positions to the other.

2. A tool-changing mechanism as defined in claim 1, in which said two guide-ways on said guide element extend parallel to each other, said guide means for said guide element and said means for moving said guide element along said guide means being adapted for moving said element to two different spindle positions.

3. A tool-changing mechanism as defined in claim 1, in which said two guide-ways on said guide element extend in directions intersecting at a common point of action of said gripping elements which in said magazine position and in said spindle position of said guide element coincides with the position of a tool in said magazine and in said tool spindle, respectively.

4. A tool-changing mechanism as defined in claim 1, in which the axes of said guide-ways for said gripping elements are disposed within a plane extending vertical to the axis of a tool, and in which said guide element is movable in a direction parallel to said tool axis.

5. A tool-changing mechanism as defined in claim 4, in which said guide means extend in a direction vertical to the axis of said tool spindle of the machine.

6. A tool-changing mechanism as defined in claim 5, further comprising a sliding carriage carrying said guide element and movable along said guide means, and means for also moving said guide element in a direction vertical to said guide means.

7. A tool-changing mechanism as defined in claim 1, in which the axes of the tools in said tool spindle and in said magazine extend at an angle to each other, and further comprising means for pivoting said guide element about the longitudinal axis of said guide means in accordance with said angle.

8. A tool-changing mechanism as defined in claim 7, in which said axes of the tools in said tool spindle and in said magazine extend at right angles to each other.

References Cited

UNITED STATES PATENTS

| 2,540,836 | 2/1951 | Seybold | 29—200 |
| 3,293,734 | 12/1966 | Buckley | 29—200 |
| 3,368,265 | 2/1968 | Kirkham | 29—200 |

THOMAS H. EAGER, Primary Examiner

U.S. Cl. X.R.

29—211